3,324,111
SPECIOFOLINE, AN ALKALOID FROM
MITRAGYNA SPECIOSA
Arnold Heyworth Beckett, Bromley, England, assignor to Smith Kline & French Laboratories, Philadelphia, Pa., a corporation of Pennsylvania
No Drawing. Filed Aug. 10, 1964, Ser. No. 388,665
Claims priority, application Great Britain, Sept. 4, 1963, 34,981/63
1 Claim. (Cl. 260—236)

This invention relates to a new crystalline product of manufacture, more specifically a crystalline alkaloid produced from leaves of *Mitragyna speciosa*, a plant of the Rubiaceae family. This alkaloid has useful pharmacodynamic activity, particularly analgetic and antitussive activity.

The new crystalline alkaloid called speciofoline is produced from the dried, powdered leaves of *Mitragyna speciosa* by usual procedures. Speciofoline is an oxindole alkaloid, $C_{22}H_{28}N_2O_5$, melting at 202–204° C.

The new crystalline alkaloid of this invention is an orally effective analgetic and antitussive agent as shown by animal experimentation. The nontoxic pharmaceutically acceptable acid addition salts of this alkaloid are also included within the scope of this invention since such salts are likewise effective for use as antitussive and analgetic agents. Both inorganic and organic acids can be employed to form pharmaceutically acceptable salts, illustrative acids being sulfuric, nitric, phosphoric, citric, acetic, lactic, tartaric, ethanedisulfonic, sulfonic, maleic, hydrochloric, hydrobromic, benzoic and the like. These salts are prepared by methods known to the art.

Advantageously the alkaloid is formulated into pharmaceutical compositions comprising a carrier and the crystalline alkaloid or a nontoxic acid addition salt thereof in an amount sufficient to produce antitussive and analgetic activity. The pharmaceutical carrier employed in these compositions can be either solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil or an ethylene glycol. Similarly the carrier or dilutent may include a time delay material such as glyceryl monostearate or glyceryl distearate alone or with a wax.

A wide variety of pharmaceutical forms can be employed and are prepared by methods well known to the art. Thus if a solid carrier is used, the compositions can be tabletted, used as a pharmaceutical powder, placed in a hard gelatin capsule or in the form of a troche or lozenge. If a liquid carrier is used, the composition can be in the form of a soft gelatin capsule.

The crystalline alkaloid or a nontoxic organic or inorganic acid addition salt thereof, preferably with a nontoxic pharmaceutical carrier such as described above, is orally or parenterally administered to animals in pain or coughing in divided doses in dosage units.

The advantages afforded by the compositions containing per dosage unit the desired therapeutically useful amount of this alkaloid and their administration to animals are obvious. These compositions can be prepared containing exact amounts of this alkaloid by virtue of its pure crystalline state. The uniformity and standardization of the desired analgetic and antitussive effects as producde by the crystalline alkaloid is not possible with either the whole plant material of *Mitragyna speciosa* or crude extracts thereof.

The following example sets forth in detail the extraction procedure for producing the crystalline alkaloid of this invention.

EXAMPLE 1

Powdered, dried leaves of *Mitrapyna speciosa* (610 g.) are exhaustively extracted with 96% ethanol. The alcohol is removed under reduced pressure to give a syrup which is dissolved in 20 ml. of glacial acetic acid and then diluted to 1 liter with water. The precipitate is filtered off and re-extracted with 3% acetic acid. The combined acid liquor is made alkaline with ammonia and shaken with 10 ml. of 10% aqueous oxalic acid. The precipitated oxalates of the total crude alkaloids are filtered, washed with ether, followed by water to give 3.9 g. of product. The oxalates are then dissolved in a large volume of 3% acetic acid, the solution is made alkaline with ammonia and extracted with ether. The dried extract is concentrated and poured onto a column of alumina. Elution with ether gives first the alkaloid mitragynine followed by increasing trace quantities of other alkaloids as shown by thin layer chromatography. Continued elution of the alkaloids on the column with chloroform gives middle fractions shown by thin layer chromatography to be rich in one alkaloid. These are combined, the chloroform removed and the residue (0.36 g.) is dissolved in 10 ml. of 5% sulfuric acid. After treatment with charcoal, the acid solution is made alkaline with ammonia and extracted with ether. The residue after removal of the ether is crystallized from 1:1 acetone/*n*-hexane to give speciofoline as slender colorless needles (0.23 g.), M.P. 202–204° C.

*Characterization of Speciofoline*

$[\alpha]_D^{22}$ —103° (C, 2 in chloroform)

pKa:6.3 (in water)

$C_{22}H_{28}N_2O_5$ requires C, 66.0; H, 7.0; N, 7.0; $OCH_3$, 15.5; equivalent weight 400.

Found: C, 66.2; H, 6.8; N, 7.5; OCH, 15.0; equivalent weight 394.

Infrared absorption (Nujol):
2500 (broad), 1700, 1620, 1600, 1280, 1260 and 1230 (doublet), 1145, 1102, 995, 808, 780 and 750 reciprocal centimeters.

Ultraviolet absorption (ethanol);
maxima, 223 m$\mu$ (log $\epsilon$=4.47), 242 m$\mu$ (log $\epsilon$=4.27) and 290 m$\mu$ (log $\epsilon$=3.49);
minima, 230 m$\mu$ (log $\epsilon$=4.08) and 274 m$\mu$ (log $\epsilon$=3.14).

What is claimed is:

Speciofoline, a crystalline substance analyzing for the empirical formula $C_{22}H_{23}N_2O_5$, being characterized by:
 a melting point of 202–204° C.;
 an optical rotation as follows:
  $[\alpha]_D^{22°}$=—103° (concentration=2% in chloroform);
 an ultraviolet absorption spectrum in ethanol with the following maxima:
  $\lambda_{max.}$ 223 m$\mu$ (log $\epsilon$=4.47),
  $\lambda_{max.}$ 242 m$\mu$ (log $\epsilon$=4.27) and
  $\lambda_{max.}$ 290 m$\mu$ (log $\epsilon$=3.49)

and the following minima:

$\lambda_{min.}$ 230 m$\mu$ (log $\epsilon$=4.08) and
$\lambda_{min.}$ 274 m$\mu$ (log $\epsilon$=3.14);

an infrared absorption spectrum in a hydrocarbon oil with bands at the following wavelengths, expressed in reciprocal centimeters: 2500 (broad), 1700, 1620, 160, 1280, 1260 and 1230 (doublet), 1145, 1102, 995, 808, 780 and 750; and a hydrobromide salt having a melting point of 219-221° C.

References Cited

Beckett et al., Jour. Pharmacy and Pharmacology, vol. 15 supp. (December 1963), page 158T.

Beckett et al., Tetrahedron Letters, No. 25 (October 1963), pages 1709–14.

Hendrickson et al., Chemical Abstracts, vol. 59 (1963), page 10148.

WALTER A. MODANCE, *Primary Examiner.*

JAMES A. PATTEN, *Assistant Examiner.*

UNITED STATES PATENT OFFICE

CERTIFICATE OF CORRECTION

Patent No. 3,324,111                      June 6, 1967

Arnold Heyworth Beckett

It is hereby certified that error appears in the above numbered patent requiring correction and that the said Letters Patent should read as corrected below.

Column 2, line 56, for "$C_{22}H_{23}N_2O_5$" read -- $C_{22}H_{28}N_2O_5$ --;

column 3, line 7, for "160" read -- 1600 --.

Signed and sealed this 26th day of December 1967.

(SEAL)
Attest:

Edward M. Fletcher, Jr.                      EDWARD J. BRENNER

Attesting Officer                           Commissioner of Patents